United States Patent [19]
Veronesi et al.

[11] Patent Number: 6,154,307
[45] Date of Patent: Nov. 28, 2000

[54] METHOD AND APPARATUS TO DIFFRACT MULTIPLE BEAMS

[75] Inventors: William A. Veronesi, Hartford; Frederick T. Olender, Somers; Richard A. Hart, North Granby, all of Conn.

[73] Assignees: United Technologies Corporation, Hartford; DeMaria ElectroOptics Systems, Inc., Bloomfield, both of Conn.

[21] Appl. No.: 09/157,235

[22] Filed: Sep. 18, 1998

[51] Int. Cl.⁷ .............................. G02F 1/33; G02F 1/335
[52] U.S. Cl. .................................. 359/305; 385/7
[58] Field of Search ................. 359/305; 385/7

[56] References Cited

U.S. PATENT DOCUMENTS

| | | | |
|---|---|---|---|
| 2,449,166 | 9/1948 | Herschberger | 179/100.3 |
| 3,925,666 | 12/1975 | Allan et al. | 250/338 |
| 4,112,461 | 9/1978 | Owens | 358/63 |
| 4,163,382 | 8/1979 | Amer | 73/24 |
| 4,172,382 | 10/1979 | Murphy et al. | 73/40.5 A |
| 4,372,149 | 2/1983 | Zharov | 73/24 |
| 4,394,573 | 7/1983 | Correa et al. | 250/253 |
| 4,412,445 | 11/1983 | Spellicy | 73/24 |
| 4,457,162 | 7/1984 | Rush et al. | 73/24 |
| 4,555,627 | 11/1985 | McRae, Jr. | 250/334 |
| 4,622,845 | 11/1986 | Ryan et al. | 73/24 |
| 4,635,042 | 1/1987 | Andrews | 340/605 |
| 4,743,119 | 5/1988 | Ida | 356/372 |
| 4,772,789 | 9/1988 | Maram et al. | 250/330 |
| 4,785,659 | 11/1988 | Rose et al. | 73/40.5 A |
| 4,822,168 | 4/1989 | Nogami et al. | 356/319 |
| 5,002,391 | 3/1991 | Wolfrum et al. | 356/307 |
| 5,103,675 | 4/1992 | Komninos | 73/592 |
| 5,129,255 | 7/1992 | Corbin | 73/24.02 |
| 5,161,408 | 11/1992 | McRae et al. | 73/40.7 |
| 5,296,843 | 3/1994 | Wohlstein et al. | 340/603 |
| 5,450,193 | 9/1995 | Carlsen et al. | 356/301 |
| 5,581,017 | 12/1996 | Bejtlich, III | 73/38 |
| 5,616,826 | 4/1997 | Pellaux et al. | 73/24.02 |

OTHER PUBLICATIONS

Isomet Corp., "All About Bragg Angle Errors in Acousto–Optic Modulators & Deflectors." Springfield, VA, AN772A, May 1993, pp. i–23.

Lekavich, John "Basics of Acousto–Optic Devices—Acousto–Optic Beam Modulators and Deflectors Control Laserbeams in Many Applications." Lasers & Applications, Apr. 1986, pp. 59–64.

Laser Imaging Systems, "LaserSonic LSA–3." Punta Gorda, FL, 2 pages, (1997).

Photonics Spectra, Apr. 1994, "Laser Applications," Assembly–Line Leak Testing, p. 114.

Brassington, D. J., "Photo–acoustic detection and ranging—a new technique for the remote detection of gases." J. Phys. D: Appl. Phys., 15 (1982), pp. 219–228.

Allen, Jr., John E. et al., "Optoacoustic pulses in a flame." Optics Letters, vol. 1, No. 4, Oct. 1977, pp. 118–120.

*Primary Examiner*—Robert H. Kim
*Assistant Examiner*—Gioacchino Inzirillo
*Attorney, Agent, or Firm*—Brian D. Lefort

[57] ABSTRACT

The present invention is a method and apparatus for sequentially and repetitively diffracting multiple beams at a common predetermined angle. A coincident beam source introduces a plurality of coincident beams into an acousto-optic cell at a common location and angle, wherein each beam has a different wavelength. A signal controlling apparatus sequentially and repetitively introduces a series of signals to the acousto-optic cell. Each signal has a frequency, which corresponds to one of the multiple beams such that when the acousto-optic cell receives the signal, the acousto-optic cell operates at such frequency and diffracts the corresponding beam at the predetermined angle.

31 Claims, 4 Drawing Sheets

METHOD AND APPARATUS TO DIFFRACT MULTIPLE BEAMS

CROSS REFERENCES TO RELATED APPLICATIONS

Copending U.S. patent application, Ser. No. 09/156,338, entitled "System To Control The Power Of A Beam", filed contemporaneously herewith, contains subject matter related to the disclosure herein.

This invention was made with United States Government support under contract number 70NANB5H1122, awarded by the National Institute of Standards and Technology. The Government has certain rights in this invention.

TECHNICAL FIELD

This invention relates to acousto-optic cells and more particularly to diffracting multiple beams using a single acousto-optic cell.

BACKGROUND ART

Leak testing of various components (or systems) which are required to be gas-tight or liquid-tight, such as heat exchanger coils, fuel tanks, pressure vessels, fuel or hydraulic lines, etc., is a common step in the manufacturing process of such components. It is known in the art of leak testing to detect various structural flaws in components, such as leaky joints, cracks, porosity, and the like, by pressurizing the component with a gas and detecting trace quantities of the gas leaking from such components.

One way to detect such leaking gas is to use a known "photo-acoustic" effect. The photo-acoustic effect, as is known, occurs when the gas absorbs a beam of light having a particular wavelength. When the gas absorbs the beam, the absorbed optical energy heats the gas, thereby causing it to expand. As the heated gas expands, it produces pressure or acoustic waves (i.e., sound) which propagate from the point of heating. An acoustic sensor, such as a microphone, detects the acoustic waves and produces an electrical signal indicative of the acoustic waves.

The electrical signal may also represent acoustic waves produced from background noise, which is generated by two distinct sources. The first source of background noise is the component. When the component being tested absorbs the beam energy, the component produces background noise in the form of an acoustic wave. The second source of acoustic background noise is the surrounding environment such as machinery, passing vehicles, compressed air, etc. As discussed in pending U.S. patent application Ser. No. 08/835, 043, a second beam can be used to generate a baseline acoustic signal indicative of the acoustic background noise. The second beam, having a wavelength which the leaking gas does not absorb, scans the component. The acoustic sensor detects and delivers an electrical signal indicative of the background noise to a processor, which also receives an electrical signal indicative of the acoustic wave produced by the gas and the background noise. The processor then subtracts the baseline acoustic signal from the electrical signal generated by the first beam yielding a signal indicative of only the leaking gas.

The comparative acoustic signals are produced by contacting the same point on the component with alternating first and second beams. The sensitivity of the leak detection system is proportional to the rate at which the comparative acoustic signals are produced, which, in turn, is a function of the rate at which the first and second beams alternatively contact the point under test. The comparison rate of the electrical signals generated by the first and second beams, however, limits the sensitivity of the leak detection system since the comparison rate is restrained by the rate at which the alternating first and second beams are produced. Existing switching techniques used to produce alternating first and second beams utilize the mechanical movement of numerous components, such as multiple mirrors, beam combiners, etc., thereby demanding excess space and increased cost. Relying upon the mechanical movement of the above mentioned components to produce alternating beams, thereby limits the production of alternating first and second beams to about 100 HZ. The rate of mechanical switching does not ensure that the first and second beams contact the same point on the component. Specifically, it is possible that the component or device directing the first and second beams may move between the alternating cycle, thereby allowing one of the alternating beams to contact a different point on the component which decreases the accuracy of the leak detection system. Although existing switching techniques may be used to alternate the first and second beams, the existing switching techniques are limited in speed to a rate of mechanical switching, thereby decreasing the sensitivity and accuracy of the leak detection system.

DISCLOSURE OF INVENTION

Accordingly the present invention is a method for diffracting each of at least two coincident beams of different wavelengths by passing the coincident beams through an acousto-optic cell which diffracts the beams according to their respective wavelengths and the frequency of a signal applied to the acousto-optic cell, and applying signals sequentially and repetitively thereto, the frequency of each signal being selected such that the acousto-optic cell sequentially and repetitively diffracts each of the coincident beams at the same angle.

In one embodiment of the present invention, two light beams consisting of different wavelengths are continuously introduced to the acousto-optic cell, and two signals having different frequencies are selected and rapidly and alternately introduced to the acousto-optic cell such that the diffracted portions of the two beams are alternately and rapidly emitted from the acousto-optic cell along the same path.

This process may be used to rapidly and alternately direct two light beams having different wavelengths into a waveguide, such as for contacting a component containing a gas which upon absorbing one of the beams emits an acoustic signal indicating the presence of a leak within the component. Although designed originally for use in a leak detection system, the present invention may be used in a wide variety of applications.

The foregoing and other features and advantages of the present invention will become more apparent in light of the following detailed description of exemplary embodiments thereof as illustrated in the accompanying drawings.

BEST MODE FOR CARRYING OUT THE INVENTION

Figure 1:
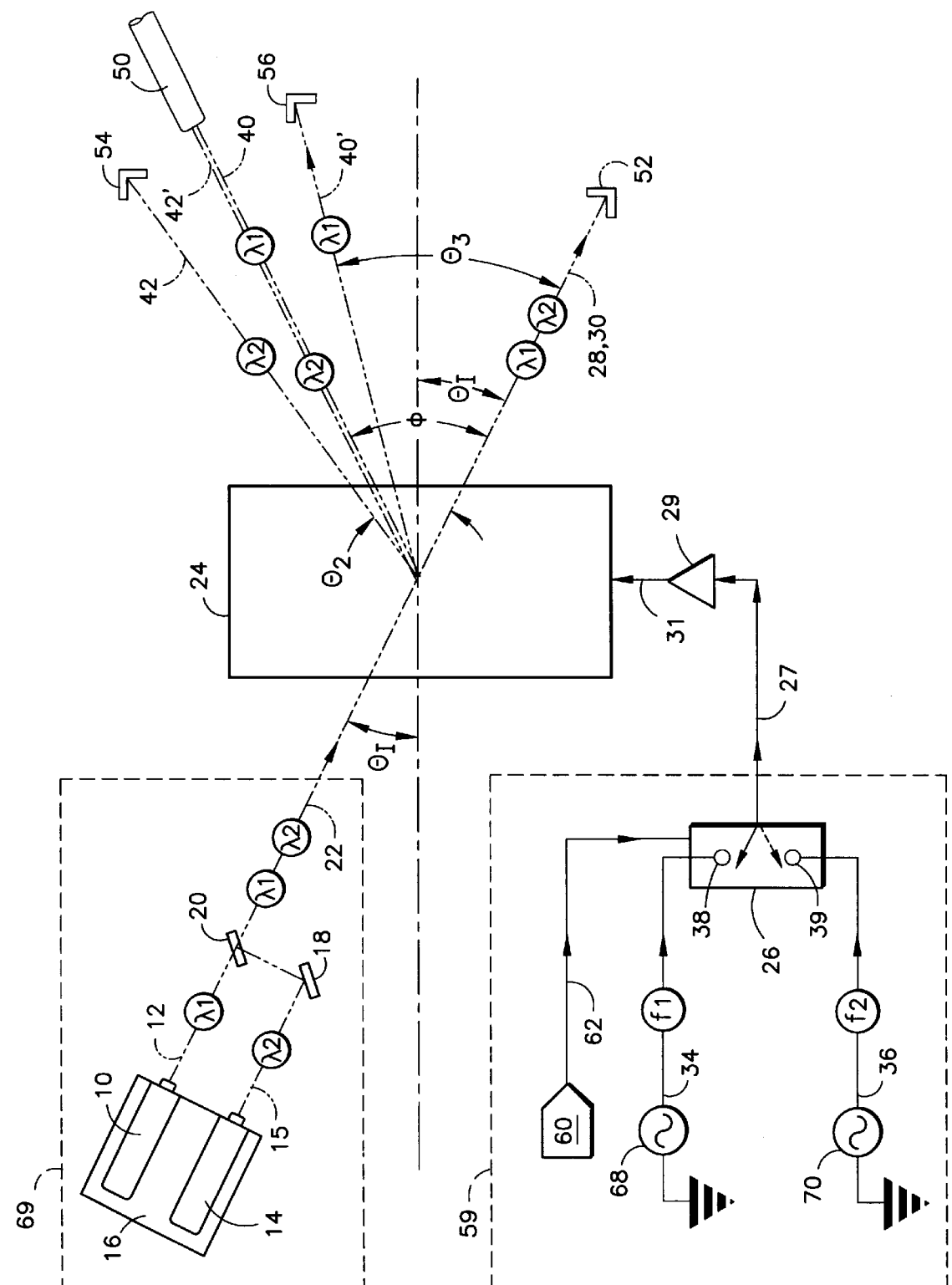
FIG. 1 is a schematic diagram of the apparatus of the present invention for diffracting multiple beams.

Referring to FIG. 1, a multiple beam diffracting apparatus 2 comprises an acoustic-optic cell 24, a coincident beam source 69, and a signal generating apparatus 59.

Figure 2:
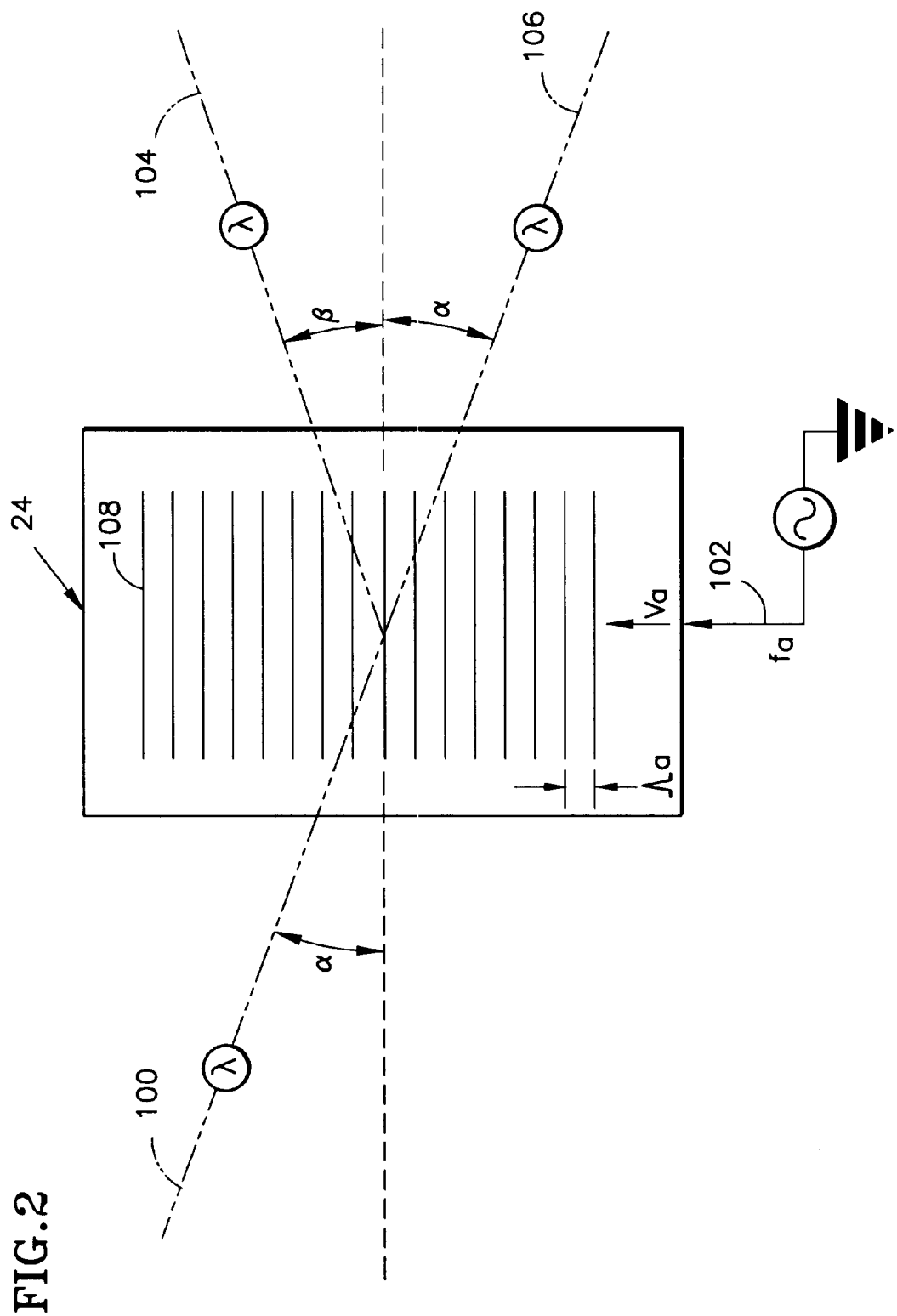
FIG. 2 is a schematic diagram of a single acousto-optic cell diffracting a beam.

The cell 24 is best understood with reference to FIG. 2. The acousto-optic cell 24 has a single beam 100 incident thereon and receives a signal 102 having a frequency ($f_a$) which is the acoustic drive frequency of the cell 24. The signal 102 creates acoustic waves, illustrated by a series of equally spaced lines 108, thereby creating a diffraction grating within the acousto-optic cell 24. The distance between the lines 108 is the acoustic wavelength ($\Lambda_a$) of the acousto-optic cell 24. The acoustic wavelength ($\Lambda_a$) is a function of the acoustic velocity ($V_a$) and the acoustic drive frequency ($f_a$) of the acousto-optic cell 24. Specifically, the acoustic wavelength ($\Lambda_a$) can be expressed according to the following formula:

$$\Lambda_a = \frac{V_a}{f_a} \qquad \text{Eq. 1}$$

where, $V_a$=acoustic velocity $f_a$=acoustic drive frequency

The acoustic velocity ($V_a$) of the acousto-optic cell 24 is a function of the material from which the acousto-optic cell 24 is constructed. Possible materials may include germanium, fused quartz, dense flint glass, gallium phosphide, lithium niobate, lead molybdate and tellurium dioxide, among others. For example, Model AGM-406B21, manufactured by IntraAction Corporation, is constructed of Germanium and has an acoustic velocity ($V_a$) of about 5.5 mm/$\mu$s. With the acoustic velocity ($V_a$) constant, the acoustic drive frequency ($f_a$) and the acoustic wavelength ($\Lambda_a$) are inversely related. Hence, altering the acoustic drive frequency ($f_a$) alters the acoustic wavelength ($\Lambda_a$), thereby changing the spacing between the waves forming the grating.

While operating at the acoustic drive frequency ($f_a$), the acousto-optic cell 24 diffracts a beam 100, having a wavelength ($\lambda$), incident thereon, at an angle ($\alpha$), into a first order beam 104 and a zero order beam 106. The zero order beam 106 exits the acousto-optic cell 24 at angle ($\alpha$), and the first order beam 104 exits the acousto-optic cell 24 at angle ($\beta$). The power level of the first order beam 104 is a function the angle ($\alpha$) at which the beam 100 enters the acousto-optic cell 24. The power level of the first order beam 104 is greatest when the beam 100 enters the acousto-optic cell 24 at the Bragg angle ($\theta_B$). Therefore, when attempting to maximize the power level of the first order beam 104, it is preferred that the beam 100 enter the acousto-optic cell 24 at the Bragg angle ($\theta_B$) When the beam 100 enters the acousto-optic cell 24 at the Bragg angle ($\theta_B$), the first order beam 104 exits the acousto-optic cell 24 at an angle equal to twice the Bragg angle ($\theta_B$) relative to the zero order beam 106. In other words, when the angle ($\alpha$) is equal to the Bragg angle ($\theta_B$), the sum of angle ($\alpha$) and angle ($\beta$) is equal to twice the Bragg angle ($\theta_B$).

The Bragg angle ($\theta_B$) can be expressed in the following formula:

$$\theta_B \cong \frac{\lambda}{2\Lambda_a} \qquad \text{Eq. 2}$$

where, $\theta_B$=Bragg angle $\lambda$=beam wavelength $\Lambda_a$=acoustic wavelength of the acousto-optic cell Replacing the acoustic wavelength ($\Lambda_a$) in Eq. 2 with its formulaic equation in Eq. 1 produces the following Bragg angle ($\theta_B$) formula:

$$\theta_B \cong \frac{\lambda f_a}{2V_a} \qquad \text{Eq. 3}$$

The Bragg angle ($\theta_B$) is, therefore, a function of beam wavelength ($\lambda$), acoustic velocity ($V_a$) and acoustic drive frequency ($f_a$). With the acoustic velocity ($V_a$) and acoustic drive frequency ($f_a$) held constant, the Bragg angle ($\theta_B$) differs for beams having different wavelengths. Therefore, when two beams having different wavelengths are coincident on an acousto-optic cell 24, the angles at which the first order beams exit the acousto-optic cell 24 differ.

It has been discovered that an acousto-optic cell 24 can alternately diffract multiple beams at the same angle by supplying the acousto-optic cell 24 with selected signals such that the frequency of the signal causes the acousto-optic cell 24 to diffract one of the multiple beams at a predetermined angle. It is preferred that the Bragg angle ($\theta_B$) of each of the multiple beams approximate each other in order to maximize the power level of the first order beams exiting the acousto-optic cell 24. It is also preferred that each of the multiple beams contact the acousto-optic cell 24 at a common point and common angle. One method of ensuring that each beam contacts the acousto-optic cell 24 at a common point and common angle is to create a coincident beam.

Referring back to FIG. 1, the coincident beam source 69 comprises a first laser 10, a second laser 14 and a means for combining the multiple beams. The first laser 10 produces a first beam 12, having a first wavelength ($\lambda_1$), which is incident on a beam combiner 20. The second laser 14 produces a second beam 15, having a second wavelength ($\lambda_2$), which is incident on a mirror 18. The mirror 18 reflects the beam 15 toward the beam combiner 20 which combines the first beam 12 and the second beam 15 into a coincident beam 22. Although the coincident beam 22 actually consists of two (2) beams (i.e., the first beam 12 and the second beam 15), the coincident beam 22 appears as one beam because both the first and second beams 12, 15 occupy the same space at the same time.

The coincident beam 22 contacts the acousto-optic cell 24, capable of operating at a range of acoustic frequencies, at a coincident angle ($\theta I$). The acoustic drive frequency ($f_a$) at which the acousto-optic cell 24 operates is equal to the frequency of the signal supplied by a signal controlling apparatus 59. The signal controlling apparatus 59 comprises a switch 26, a first signal controller 68 and a second signal controller 70. The first signal controller 68, such as a crystal control oscillator, emits a first signal, having a first frequency ($f_1$), along line 34 to the switch 26. The second signal controller 70 emits a second signal, having a second frequency ($f_2$), along line 36 to the switch 26. The switch 26 has a first position 38 and a second position 39. When the switch 26 is in the first position 38, the switch 26 emits the first signal along line 27, and when the switch 26 is in the second position 39, the switch 26 emits the second signal along line 27. A radio frequency (RF) amplifier 29 increases the amplitude (i.e., power level) of the first and second signals being introduced thereto along line 27 and emits an acoustic drive signal along line 31 to the acousto-optic cell 24. The acoustic drive signal is equal to the first or second frequency ($f_1$), ($f_2$), depending upon the position of the switch 26, and becomes the acoustic drive frequency ($f_a$) of the acousto-optic cell 24. Specifically, when the switch 26 is in the first position 38, the acoustic drive frequency ($f_a$) of the acousto-optic cell 24 is equal to the frequency of the first signal, and when the switch 26 is in the second position 39, the acoustic drive frequency ($f_a$) is equal to the frequency of the second signal. Although an amplifier 29 is not a necessary component of the present invention, incorporating an amplifier 29 between the signal controlling apparatus 59 and the acousto-optic cell 24 allows the use of lower level signals within the frequency alternating device 59.

When the switch 26 is in the first position 38, the acousto-optic cell 24 diffracts the first beam 12 into a first wavelength zero order beam 28 and a first wavelength first order beam 40. The first wavelength zero order beam 28 exits the acousto-optic cell 24 at the coincident angle ($\theta_I$) and contacts a beam absorber 52. The first wavelength first order beam 40, however, exits the acousto-optic cell 24 at a predetermined angle ($\phi$). While the switch 26 remains in the first position 38, the acousto-optic cell 24 diffracts the second wavelength ($\lambda_2$) into a second wavelength zero order beam 30 and a second wavelength first order beam 42. The second wavelength zero order beam 30 exits the acousto-optic cell 24 at the coincident angle ($\theta_I$) while the second wavelength first order beam 42 exits the acousto-optic cell 24 at a second angle ($\theta_2$). The beam absorber 52 absorbs the second wavelength zero order beam 30, and another beam absorber 54 absorbs the second wavelength first order beam 42. For example, when the switch 26 is in the first position 38, the acousto-optic cell 24 (Model AGM-406B21, manufactured by IntraAction Corporation) operating at a first frequency ($f_1$) of about 46 MHz, diffracts the first wavelength ($\lambda_1$) of 9.07 µm into a first wavelength first order beam 40 at an angle of about 0.0759 radians (about 4.35 degrees). The acousto-optic cell 24 also diffracts the second wavelength ($\lambda_2$) of 10.55 µm into a second wavelength first order beam 42 at a second angle ($\theta_2$) of about 0.0882 radians (about 5.06 degrees).

When the position of the switch 26 is changed from the first position 38 to the second position 39, the first wavelength and second wavelength zero order beams 28, 30 continue to exit the acousto-optic cell 24 at the coincident angle ($\theta_I$). However, the acousto-optic cell 24 diffracts the second wavelength first order beam 42' at the predetermined angle ($\phi$) and diffracts the first wavelength first order beam 40' at a third angle ($\theta_3$). Changing the position of the switch 26 to the second position 39 changes the acoustic drive frequency ($f_a$) to the frequency of the second signal and moves the second wavelength first order beam 42' from the second angle ($\theta_2$) to the predetermined angle ($\phi$).

The frequency ($f_2$) of the second signal is a function of the frequency ($f_1$) of the first signal. Equating the angle at which the first wavelength first order beam 40 exits the acousto-optic cell 24, when operating at a first frequency ($f_1$), to the angle at which the second wavelength first order beam 42 exits the acousto-optic cell 24, when operating at the second frequency ($f_2$), and equating each angle to the predetermined angle ($\phi$) produces the following equation.

$$\frac{\lambda_1 f_1}{2V_a} = \frac{\lambda_2 f_2}{2V_a} \qquad \text{Eq. 4}$$

Since the acoustic velocity ($V_a$) remains constant, the second frequency can be expressed according to the following equation:

$$f_2 = \frac{\lambda_1}{\lambda_2} f_1 \qquad \text{Eq. 5}$$

Therefore, when the second frequency ($f_2$) is equal to the product of the first frequency ($f_1$) and ratio of the first wavelength ($\lambda_1$) to the second wavelength ($\lambda_2$), the second wavelength first order beam 42 exits the acousto-optic cell 24, operating at the second frequency ($f_2$), at the predetermined angle ($\phi$). By changing the position of the switch 26 from first position 38 to the second position 39, the beam exiting the acousto-optic cell 24, at the predetermined angle ($\phi$), changes from the first wavelength first order beam 40 to the second wavelength first order beam 42 and vice versa.

For example, when the switch 26 is in the second position 39, the acousto-optic cell 24 (Model AGM-406B21, manufactured by IntraAction Corporation) operating at a second frequency ($f_2$) of about 39.55 MHz, diffracts the second wavelength ($\lambda_2$) of 10.55 µm into a second wavelength first order beam 42' at an angle of about 0.0759 radians (about 4.35 degrees). This is the same angle at which the acousto-optic cell 24, operating at the first frequency ($f_1$) of 46 MHz, diffracted the first wavelength first order beam 40. The acousto-optic cell 24 also diffracts the first wavelength ($\lambda$) of 9.07 µm into a first wavelength first order beam 40' at a third angle ($\theta_3$) of about 0.0642 radians (about 3.74 degrees).

A preferred embodiment of signal controlling apparatus 59 includes a control 60, which produces a control signal along line 62 to the switch 26, thereby causing the switch 26 to alternate between the first position 38 and the second position 39. The rate at which the switch 26 alternates positions is limited by the speed of the acousto-optic cell 24, which is capable of operating at 500 kHz. It is preferred that the control signal causes the switch 26 to alternate between the first and second position 38, 39 at a rate greater than 100 HZ. Alternating the position of the switch 26 at such a rate, thereby causes the acousto-optic cell 24 to emit alternating first and second beams 12, 15 at the predetermined angle ($\phi$) at a rate greater than possible with mechanical switching techniques. It is more preferable that the control signal cause the switch 26 to alternate between the first and second position 38, 39 at a rate of at least 50 kHz. It is even more preferable that the control signal cause the switch 26 to alternate between the first and second position 38, 39 at a rate of at least 75 kHz. It is especially preferable to alternate the position of the switch 26 at a rate up to 500 kHz. Alternating the first and second positions 38, 39 of the switch 26 at such rates creates a pulsing effect such that the acousto-optic cell 24 emits alternating pulsed first and second wavelength first order beams 40, 42' at the predetermined angle ($\phi$).

Although the present invention describes a multiple beam diffracting apparatus 2 comprising an acousto-optic cell 24 capable of diffracting two beams at a predetermined angle ($\phi$), the acousto-optic cell 24 is capable of diffracting more than two beams. Such a system would include an increased number of corresponding lasers, signal controllers and switch positions. When the switch is in a position other than the first or second position, the switch would transmit an additional signal having a frequency ($f_x$), produced by the corresponding signal controller, to the acousto-optic cell 24. The additional frequency ($f_x$) would be a frequency such that the acousto-optic cell 24 would diffract an additional corresponding beam having a wavelength ($\lambda_x$) at the predetermined angle ($\phi$). The additional frequency can be expressed according to the following formula:

$$f_x = \frac{\lambda_1}{\lambda_x} f_1 = \frac{\lambda_2}{\lambda_x} f_2 \qquad \text{Eq. 6}$$

where, $f_x$=acoustic frequency to diffract additional beam at predetermined angle ($\phi$)

$\lambda_x$=wavelength of additional beam

Therefore, in order for the acousto-optic cell 24 to diffract additional first order beams at the predetermined angle ($\phi$), the necessary acoustic frequency ($f_x$) must be equal to the product of the first frequency ($f_1$) and the ratio of the first wavelength ($\lambda_1$) to the wavelength ($\lambda_x$) of the additional beam; or the necessary frequency ($f_x$) must be equal to the product of the second frequency ($f_2$) and the ratio of the second wavelength ($\lambda_2$) to the wavelength ($\lambda_x$) of the additional beam. Switching between the necessary acoustic frequency ($f_x$) the first frequency ($f_1$) and the second frequency ($f_2$) changes which wavelength exits the acousto-optic cell 24 at the predetermined angle ($\phi$).

Figure 3:
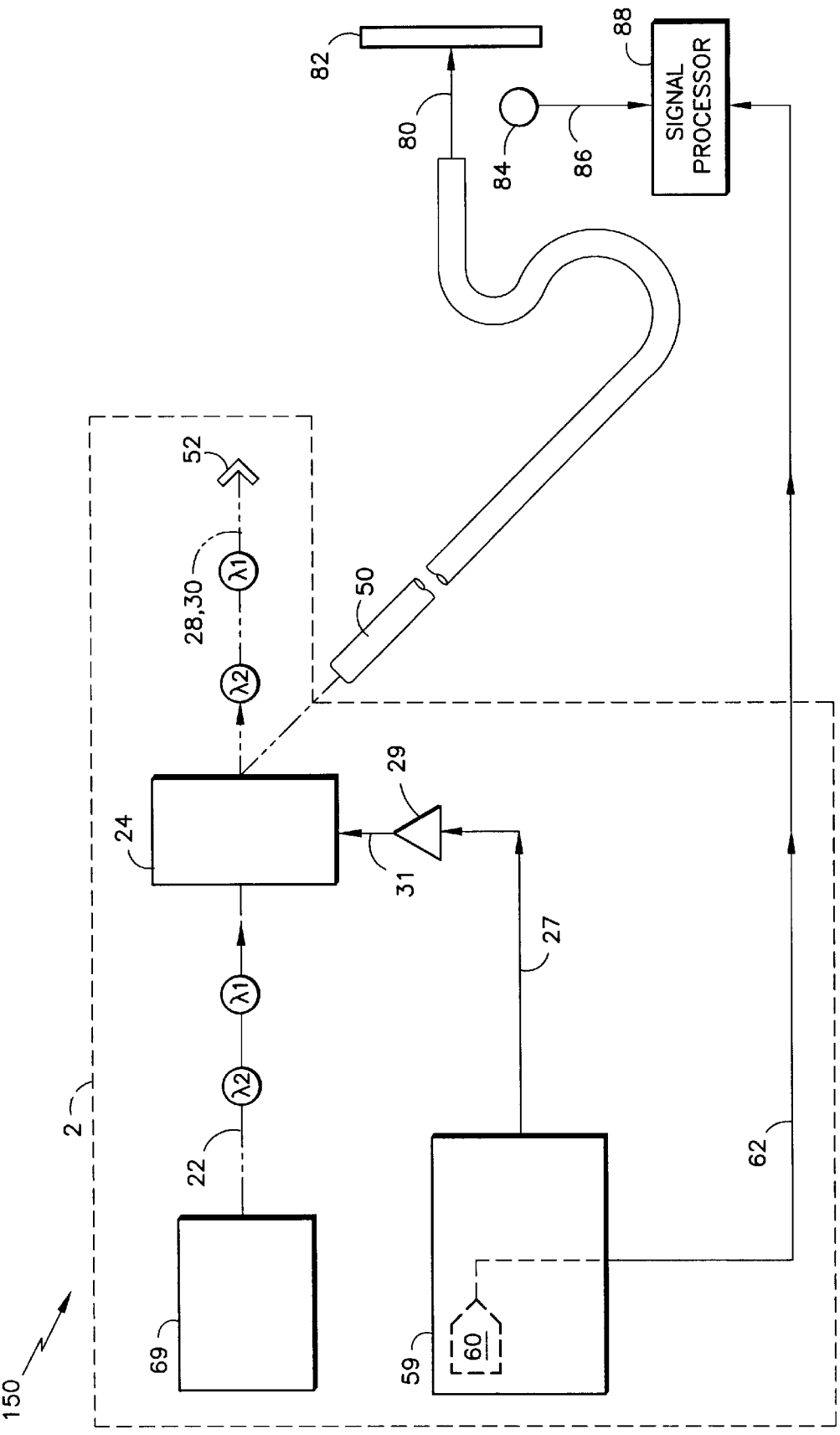
FIG. 3 is schematic diagram of a photo-acoustic leak detection system employing the multiple beam diffracting apparatus of the present invention.

Referring to FIG. 3, a further embodiment of the. present invention is a photo-acoustic leak detection system 150. The photo-acoustic leak detection system 150 comprises the multiple beam diffracting apparatus 2 (discussed hereinbefore), a waveguide 50, an acoustic sensor 84, a signal processor 88 and a component 82 containing a gas. The waveguide 50 is aligned with the predetermined angle ($\phi$), such that when the multiple beam diffracting apparatus 2 emits a beam at the predetermined angle ($\phi$), the beam enters the waveguide 50. The waveguide 50 transmits the beam from one of its end to its other end and may contain an optical fiber to achieve this purpose. The waveguide 50 may be rigid or flexible, and a flexible waveguide 50 provides the capability of directing the beam 80 toward the component 82 at substantially any location and angle.

The gas is capable of absorbing the first beam 12 but is incapable of absorbing the second beam 15. For example, a tracer gas, such as sulfur hexafluoride ($SF_6$), does not absorb the first beam 12 having a 9.07 μm wavelength, but the tracer gas absorbs the second beam 15, having a 10.55 m wavelength.

When the switch 26 is in the first position 38, the acousto-optic cell 24 directs the first beam 12 into the waveguide 50, which, in turn, emits a beam 80, containing first wavelength ($\lambda_1$). The beam 80, containing the first wavelength ($\lambda_1$), contacts the component 82 being tested for leaks and any leaking gas. Upon such contact the component 82 produces a first acoustic signal indicative of the background noise. An acoustic sensor 84, such as a microphone, senses the first acoustic signal and produces a first sensor signal along line 86 to a signal processor 88, which uses such signal as a non-leak baseline measurement.

When the switch 26 is in the second position 39, the acousto-optic cell 24 directs the second wavelength ($\lambda_2$) into the waveguide 50 which emits a beam 80, containing second wavelength ($\lambda_2$). The beam 80, containing the second wavelength ($\lambda_2$), contacts the component and any leaking gas. The gas and the component absorb the beam 80 upon such contact and produce a second acoustic signal. The acoustic sensor 84 senses the second acoustic signal and produces a second sensor signal along line 86 to the signal processor 88. It is also preferred that the control 60, within the signal controlling apparatus 59, deliver a synchronization signal along line 62 to the signal processor 88, thereby synchronizing the first and second beams 12, 15 with their respective acoustic signals. The signal processor 88 uses the first sensor signal as a non-leak baseline measurement and subtracts the first sensor signal from the second sensor signal and produces an output signal indicative of whether a leak exists.

Figure 4:
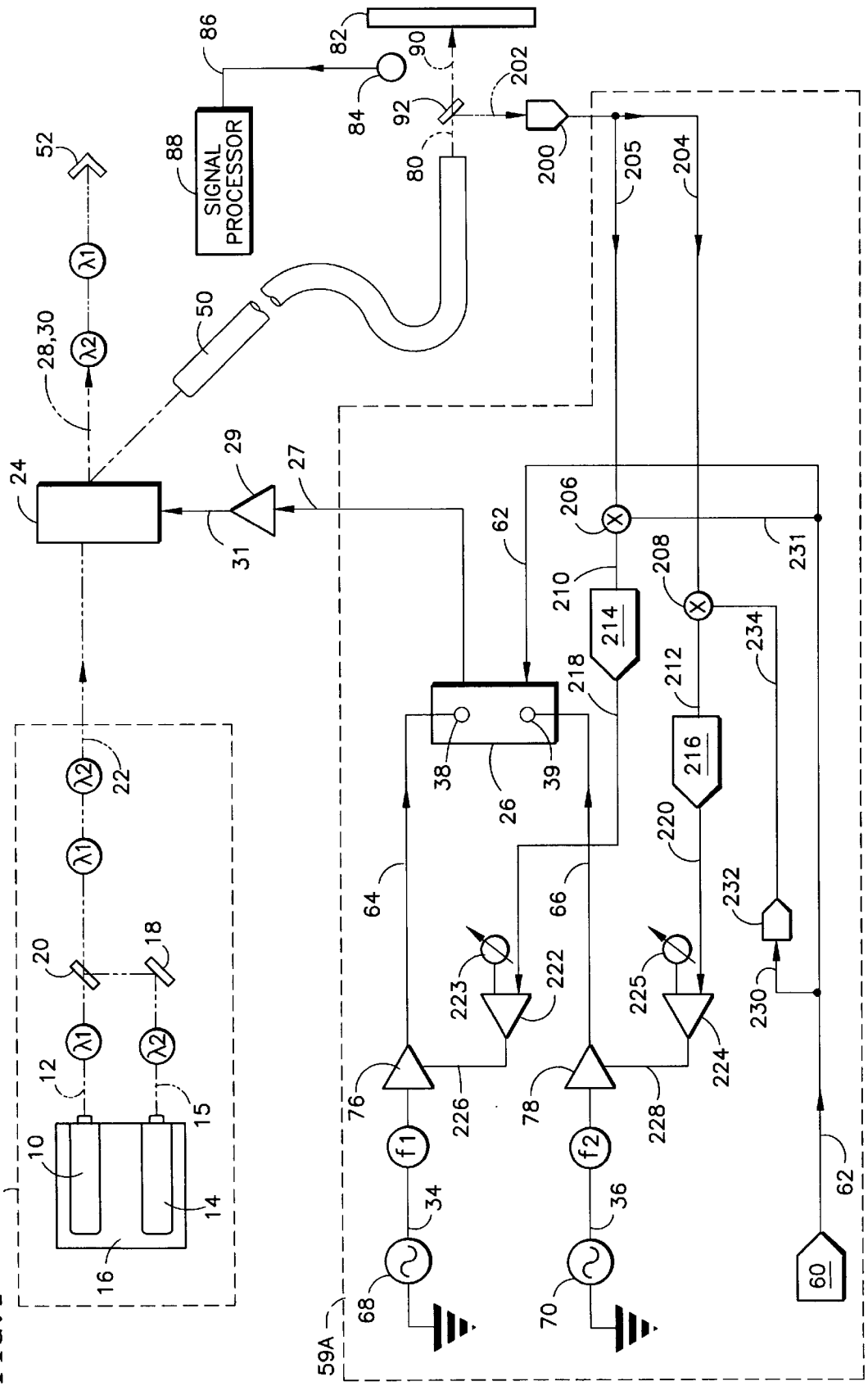
FIG. 4 is a schematic diagram of a photo-acoustic leak detection system having the ability to control the power level of multiple beams exiting a waveguide.

Referring to FIG. 4, a further embodiment of the present invention is a system to control the power level of multiple beams exiting the waveguide 50. The system comprises a coincident beam source 69, an acousto-optic cell 24, an alternate embodiment of the signal controlling apparatus 59A, a waveguide 50, a beam splitter 92, and a beam detector 200. The coincident beam source 69, acousto-optic cell 24, and waveguide 50 have been discussed hereinbefore in reference to FIG. 1.

The signal controlling apparatus 59A comprises all items comprised within the signal controlling apparatus 59 illustrated in FIG. 1 and additional items which have been added to control the intensity of the beam 80 by adjusting the amplitude of the acoustic drive frequency (fa). The items similar to signal controlling apparatus 59A and the signal controlling apparatus 59 have the same reference numerals. The signal controlling apparatus 59A comprises a control 60, an inverter 232, a switch 26 and corresponding first and second signal controllers 68, 70, mixers 206, 208, filters 214, 216, error amplifiers 222, 224 and variable amplitude sources 76, 78 (i.e., variable gain amplifier or attenuator). Although it is not necessary, it is preferred that the frequency alternating device 59A include filters 214, 216 in order to minimize any undesired electric feedback noise within the system. The filters 214, 216 may be low pass filters, bandpass filters, etc.

Regardless of whether the beam 80 contains the first wavelength ($\lambda_1$) or the second wavelength ($\lambda_2$), the beam splitter 92 splits the beam 80 into a passthrough beam 90 and a reference beam 202. For example, the beam splitter 92 splits about 99.8 percent of the 80 into the passthrough beam 90 and about 0.2 percent of the beam 80 into the reference beam 202. The percentages at which the beam splitter 92 divides beam 80 into a passthrough beam 90 and a reference beam 202 is related to the sensitivity of the beam detector 200.

The reference beam 202 contacts a beam detector 200 which senses the power level of the reference beam 202 and produces a beam power signal, indicative of the power level of the beam 80, along line 204 to the signal controlling apparatus 59A. Within the signal controlling apparatus 59A, the line 204 splits into line 205 such that the first mixer 206 receives the beam power signal from line 205 and the second mixer 208 receives the beam power signal along line 204. The first and second mixers 206, 208 also continually receive the control signal, produced by the control 60. Specifically, the control emits a control signal along line 62, which splits into lines 230 and 231. The switch 26 receives the control signal along line 62. The first mixer 206 receives the control signal along line 231. The inverter receives the control signal along line 230 and emits an inverse control signal along line 234 to the second mixer 208.

When the control signal causes the switch 26 to be in the first position 38, the control signal prevents the second mixer 208 from emitting the beam power signal to the second filter 216, thereby rendering all signals downstream of the second mixer 208 equal zero. However, when the control signal causes the switch 26 to be in the first position 38, the control signal causes the first mixer 206 to advance the beam power signal to the first filter 214 along line 210. The first low pass filter 214 produces a filtered control signal, which travels along line 218 to the first error amplifier 222. The first error amplifier 222 includes a set point controller 223 which is set at a first set-point such that the power level of the beam 80, containing the first wavelength ($\lambda_1$), exiting the waveguide 50 is equal to a first predetermined power level. If the filtered power signal is different than the first set-point, the first error amplifier 222 produces a correction signal which travels along line 226 to the first variable amplitude source 76. The first variable amplitude source 76 adjusts the amplitude of frequency of the first signal and produces an adjusted first signal such that the power level of the beam 80 is equal to the first predetermined power level when the beam 80 contains the first wavelength ($\lambda_1$). The adjusted first signal travels along line 64 to the first position 38 of the switch 26. Therefore, when the switch 26 is in the first position 38, the acousto-optic cell 24 diffracts the first beam 12 at the predetermined angle ($\phi$), and the waveguide 50 emits the beam 80 containing the first wavelength ($\lambda_1$) at a power level equal to the first predetermined power level.

When the control signal causes the switch 26 to be in the second position 39, the control signal prevents the first mixer 206 from emitting the beam power signal to the first filter 214, thereby rendering all signals downstream of the first mixer 206 equal to zero. However, when the control signal causes the switch 26 to be in the second position 39, the control signal causes the second mixer 208 to advances the beam power signal to the second filter 216 along line 212. The second low pass filter 216 produces a filtered control signal, which travels along line 220 to the second error amplifier 224. The second error amplifier 224 includes a set point controller 225 which is set at a second set-point such that the power level of the beam 80, containing the second wavelength ($\lambda_2$), exiting the waveguide 50 is equal to a second predetermined power level. If the filtered power signal is different then the second set-point, the second error amplifier 224 produces a correction signal which travels along line 228 to the second variable amplitude source 78. The second variable amplitude source 78 adjusts the amplitude of the frequency of the second signal and produces an adjusted second signal such that the power level of the beam 80 is equal to the second predetermined power level when the beam 80 contains the second wavelength ($\lambda_2$). The adjusted second signal travels along line 66 to the second position 39 of the switch 26. Therefore, when the switch 26 is in the second position 39, the acousto-optic cell 24 diffracts the second beam 15 at the predetermined angle ($\phi$), and the waveguide 50 emits the beam 80 containing the second wavelength ($\lambda_2$) at a power level equal to the second predetermined power level. When the set point controllers 223, 225 are set such that first set-point is equal to the second set-point, the beam 80 will have the same power level regardless of whether the beam 80 contains the first wavelength ($\lambda_1$) or the second wavelength ($\lambda_2$).

The present invention represents a significant improvement over the prior art switching techniques used to alternate between beams because the present invention electrically alternates multiple beams rather than mechanically alternating such beams. Unlike the present invention, the prior art fails to teach a simplified, unique means of alternatively emitting, at a predetermined angle, two or more beams, each having a different wavelength using minimal equipment. Additionally, the present invention provides a switching technique capable of alternating between multiple beams at speeds greater than possible with mechanical switching. Specifically, the present invention employs a single acousto-optic cell to diffract multiple beams at a predetermined angle while the prior art requires more than one acousto-optic cell. Incorporating the high speed switching technique of the present invention into a leak detection system, therefore, increases the efficiency and sensitivity of the leak detection system.

Although the invention has been described and illustrated with respect to the exemplary embodiments thereof, it should be understood by those skilled in the art that the foregoing and various other changes, omissions and additions may be made without departing from the spirit and scope of the invention.

What is claimed is:

1. An apparatus for diffracting multiple beams, comprising:
   (a) an acousto-optic cell capable of operating at a range of frequencies and diffracting a plurality of beams incident upon said acousto-optic cell at a common entry location and common angle, each beam having a wavelength; and
   (b) a signal controlling apparatus comprising:
      a first signal controller producing a first frequency selected such that when said acousto-optic cell operates at said first frequency, said acousto-optic cell diffracts a first of said beams at a predetermined angle;
      a second signal controller producing a second frequency selected such that when said acousto-optic cell operates at said second frequency, said acousto-optic cell diffracts a second of said beams at said same predetermined angle;
      a switch receiving said first signal and said second signal, said switch having a first position and a second position such that when said switch is in said first position said switch emits said first signal to said acousto-optic cell which operates at said first frequency, and when said switch is in said second position, said switch emits said second signal to acousto-optic cell which operates at said second frequency; and
      means for producing a control signal to said switch such that said control signal causes said switch to sequentially and repetitively alternate between said first and second positions thereby causing said acousto-optic cell to sequentially and repetitively diffract said first and second beams at said predetermined angle.

2. The apparatus of claim 1, wherein said control signal causes said switch to alternate between said first position and said second position at a rate of at least 50 kHZ.

3. The apparatus of claim 1, wherein said control signal causes said switch-to alternate between said first position and said second position at a rate of at least 75 kHz.

4. The apparatus of claim 1, wherein said control signal causes said switch to alternate between said first position and said second position at a rate up to 500 kHz.

5. The apparatus of claim 1, wherein said second frequency is equal to the product of said first frequency and a ratio of said wavelength for said first beam to said wavelength for said second beam.

6. The apparatus of claim 1 wherein said signal controlling apparatus further comprises a third signal controller producing a third signal to said switch, said third signal having a third frequency selected such that when said acousto-optic cell operates at said third frequency, said acousto-optic cell diffracts a third of said beams at said same predetermined angle and wherein said switch further comprises a third position such that when said switch is in said third position said acousto-optic cell operates at a third frequency and wherein said control signal causes said switch to sequentially and repetitively alternate between said first, second, and third positions thereby causing said acousto-optic cell to sequentially and repetitively diffract said first, second, and third beams at said predetermined angle.

7. The apparatus of claim 1, wherein said control signal causes said switch to alternate between said first position and said second position at a rate greater than 100 Hz.

8. The apparatus of claim 6, wherein said second frequency is equal to the product of said first frequency and a ratio of said wavelength for said first beam to said wavelength for said second beam, and said third frequency is equal to the product of said first frequency and a ratio of said wavelength for said first beam to said wavelength for said third beam.

9. An apparatus for diffracting multiple beams, comprising:
   (a) acousto-optic cell;
   (b) means for introducing a plurality of coincident beams to said acousto-optic cell at a common entry location and common angle, each beam having a wavelength;
   (c) means for supplying a first signal having a first frequency to said acousto-optic cell, said first frequency selected such that when said acousto-optic cell operates at said first frequency said acousto-optic cell diffracts a first of said beams at a predetermined angle;
   (d) means for supplying a second signal having a second frequency to said acousto-optic cell, said second frequency selected such that when said acousto-optic cell operates at said second frequency said acousto-optic cell diffracts a second of said beams at said predetermined angle; and
   (e) means for switching between said first and second signals wherein said switching means sequentially and repetitively supplies said first and second signals to said acousto-optic cell such that said acousto-optic cell sequentially and repetitively operates at said respective first and second frequencies thereby causing said acousto-optic cell to sequentially and repetitively diffract said first and second beams at said predetermined angle.

10. The apparatus of claim 9, wherein said means for switching causes said first signal and said second signal to alternate at a rate of at least 50 kHZ.

11. The apparatus of claim 9, wherein said means for switching causes said first signal and said second signal to alternate at a rate of at least 75 kHZ.

12. The apparatus of claim 9, wherein said means for switching causes said first signal and said second signal to alternate at a rate up to 500 kHz.

13. The apparatus of claim 9, wherein said means for switching causes said first signal and said second signal to alternate at a rate greater than 100 Hz.

14. A method for diffracting multiple beams, comprising the steps of:
   (a) introducing a plurality of coincident beams into an acousto-optic cell at a common location and angle, each beam having a different wavelength, said acousto-optic cell capable of operating at a range of frequencies and diffracting a plurality of beams;
   (b) introducing a first signal having a first frequency to said acousto-optic cell, thereby causing said acousto-optic cell to operate at said first frequency and diffract a first of said beams, having a first wavelength, at a predetermined angle;
   (c) introducing a second signal having a second frequency to said acousto-optic cell, thereby causing said acousto-optic cell to operate at said second frequency and diffract a second of said beams, having a second wavelength, at said same predetermined angle, wherein said second frequency is equal to the product of said first frequency and a ratio of said first wavelength to said second wavelength; and
   (d) sequentially and repetitively alternating between introducing said first and second signals to said acousto-optic cell such that said acousto-optic cell sequentially and repetitively operates at said respective first and second frequencies thereby causing said acousto-optic cell to sequentially and repetitively diffract said first and second beams at said predetermined angle.

15. The method of claim 14 wherein alternating between introducing said first and second signals to said acousto-optic cell occurs at a rate of at least 50 kHz.

16. The method of claim 14 wherein alternating between introducing said first and second signals to said acousto-optic cell occurs at a rate of at least 75 kHz.

17. The method of claim 14 wherein alternating between introducing said first and second signals to said acousto-optic cell occurs at a rate up to 500 kHz.

18. The method of claim 14, wherein the step of alternating between introducing said first and second signals to said acousto-optic cell occurs at a rate greater than 100 Hz.

19. A system for diffracting multiple beams, comprising:
   (a) an acousto-optic cell capable of operating at a range of frequencies and diffracting a plurality of beams;
   (b) a first laser emitting a first beam having a first wavelength;
   (c) a second laser emitting a second beam having a second wavelength;
   (d) beam combining means for combining said first and second beams into a coincident beam and directing said coincident beam at said acousto-optic cell; and
   (e) a signal controlling apparatus comprising:
      (1) a first signal controller producing a first frequency selected such that when said acousto-optic cell operates at said first frequency, said acousto-optic cell diffracts a first of said beams at a predetermined angle;
      (2) a second signal controller producing a second frequency selected such that when said acousto-optic cell operates at said second frequency, said acousto-optic cell diffracts a second of said beams at said same predetermined angle;
      (3) a switch receiving said first signal and said second signal, said switch having a first position and a second position such that when said switch is in said first position said switch emits said first signal to said acousto-optic cell which operates at said first frequency, and when said switch is in said second position, said switch emits said second signal to acousto-optic cell which operates at said second frequency; and
      (4) a control for producing a control signal to said switch such that said control signal causes said switch to sequentially and repetitively alternate between said first and second positions thereby causing said acousto-optic cell to sequentially and repetitively diffract said first and second beams at said predetermined angle.

20. An apparatus for diffracting multiple beams, comprising:
    (a) an acousto-optic cell capable of operating at a range of frequencies and diffracting a plurality of beams incident upon said acousto-optic cell at a common entry location and common angle, each beam having a different wavelength; and
    (b) a signal controlling apparatus comprising:
       a plurality of signal controllers that correspond to the number of different wavelengths, each of said signal controllers producing a different frequency signal wherein each of said frequencies is selected such that when said acousto-optic cell operates at one of said frequencies, said acousto-optic cell diffracts said corresponding beam at a predetermined angle;
       a switch having a plurality of positions that correspond to the number of different wavelengths, each of said positions within said switch receiving one of said different frequency signals such that when said switch is in one of said positions, said switch emits said corresponding frequency signal to said acousto-optic cell which operates at said corresponding frequency; and
       a means for producing a control signal to said switch such that said control signal causes said switch to sequentially and repetitively alternate between said positions thereby causing said acousto-optic cell to sequentially and repetitively diffract said beams at said predetermined angle.

21. An apparatus for diffracting multiple beams, comprising:
    (a) an acousto-optic cell capable of operating at a range of frequencies and diffracting a plurality of beams incident upon said acousto-optic cell at a common entry location and common angle, each beam having a wavelength; and
    (b) a signal controlling apparatus comprising:
       a first signal controller producing a first frequency selected such that when said acousto-optic cell operates at said first frequency, said acousto-optic cell diffracts a first of said beams at a predetermined angle;
       a second signal controller producing a second frequency selected such that when said acousto-optic cell operates at said second frequency, said acousto-optic cell diffracts a second of said beams at said same predetermined angle;
       a switch receiving said first signal and said second signal, said switch having a first position and a second position such that when said switch is in said first position said switch emits said first signal to said acousto-optic cell which operates at said first frequency, and when said switch is in said second position, said switch emits said second signal to acousto-optic cell which operates at said second frequency; and
       a control which produces a control signal to said switch, said control signal causing said switch to alternate between said first and second positions at a rate of at least 50 kHz.

22. The apparatus of claim 21 wherein said control signal causes said switch to alternate between said first and second positions at a rate of at least 75 kHz.

23. An apparatus for diffracting multiple beams, comprising:
    (a) an acousto-optic cell capable of operating at a range of frequencies and diffracting a plurality of beams incident upon said acousto-optic cell at a common entry location and common angle, each beam having a wavelength; and
    (b) a signal controlling apparatus comprising:
       a first signal controller producing a first frequency selected such that when said acousto-optic cell operates at said first frequency, said acousto-optic cell diffracts a first of said beams at a predetermined angle;
       a second signal controller producing a second frequency selected such that when said acousto-optic cell operates at said second frequency, said acousto-optic cell diffracts a second of said beams at said same predetermined angle;
       a switch receiving said first signal and said second signal, said switch having a first position and a second position such that when said switch is in said first position said switch emits said first signal to said acousto-optic cell which operates at said first frequency, and when said switch is in said second position, said switch emits said second signal to acousto-optic cell which operates at said second frequency; and
       a control which produces a control signal to said switch, said control signal causing said switch to alternate between said first and second positions at a rate up to 500 kHz.

24. An apparatus for diffracting multiple beams, comprising:
    (a) an acousto-optic cell capable of operating at a range of frequencies and diffracting a plurality of beams incident upon said acousto-optic cell at a common entry location and common angle, each beam having a wavelength; and
    (b) a signal controlling apparatus comprising:
       a first signal controller producing a first frequency selected such that when said acousto-optic cell operates at said first frequency, said acousto-optic cell diffracts a first of said beams at a predetermined angle;
       a second signal controller producing a second frequency selected such that when said acousto-optic cell operates at said second frequency, said acousto-optic cell diffracts a second of said beams at said same predetermined angle, said second frequency being equal to the product of said first frequency and a ratio of said wavelength for said first beam to said wavelength for said second beam; and
       a switch receiving said first signal and said second signal, said switch having a first position and a second position such that when said switch is in said first position said switch emits said first signal to said acousto-optic cell which operates at said first frequency, and when said switch is in said second position, said switch emits said second signal to acousto-optic cell which operates at said second frequency.

25. The apparatus of claim 24 wherein said signal controlling apparatus further comprises a third signal controller producing a third signal to said switch, said third signal having a third frequency selected such that when said acousto-optic cell operates at said third frequency, said acousto-optic cell diffracts a third of said beams at said same predetermined angle, said third frequency being equal to the product of said first frequency and a ratio of said wavelength for said first beam to said wavelength for said third beam, and wherein said switch further comprises a third position such that when said switch is in said third position said acousto-optic cell operates at a third frequency.

26. An apparatus for diffracting multiple beams, comprising:
   (a) acousto-optic cell;
   (b) means for introducing a plurality of coincident beams to said acousto-optic cell at a common entry location and common angle, each beam having a wavelength;
   (c) means for supplying a first signal having a first frequency to said acousto-optic cell, said first frequency selected such that when said acousto-optic cell operates at said first frequency said acousto-optic cell diffracts a first of said beams at a predetermined angle;
   (d) means for supplying a second signal having a second frequency to said acousto-optic cell, said second frequency selected such that when said acousto-optic cell operates at said second frequency said acousto-optic cell diffracts a second of said beams at said predetermined angle;
   (e) means for switching between said first and second frequency at a rate of at least 50 kHz.

27. The apparatus of claim 26 wherein said means for switching causes said first and second frequency to alternate at a rate of at least 75 kHz.

28. An apparatus for diffracting multiple beams, comprising:
   (a) acousto-optic cell;
   (b) means for introducing a plurality of coincident beams to said acousto-optic cell at a common entry location and common angle, each beam having a wavelength;
   (c) means for supplying a first signal having a first frequency to said acousto-optic cell, said first frequency selected such that when said acousto-optic cell operates at said first frequency said acousto-optic cell diffracts a first of said beams at a predetermined angle;
   (d) means for supplying a second signal having a second frequency to said acousto-optic cell, said second frequency selected such that when said acousto-optic cell operates at said second frequency said acousto-optic cell diffracts a second of said beams at said predetermined angle; and
   (e) means for switching between said first and second frequency at a rate up to 500 kHz.

29. A method for diffracting multiple beams, comprising the steps of:
   (a) introducing a plurality of coincident beams into an acousto-optic cell at a common location and angle, each beam having a wavelength, said acousto-optic cell capable of operating at a range of frequencies and diffracting a plurality of beams;
   (b) introducing a first signal having a first frequency to said acousto-optic cell, thereby causing said acousto-optic cell to operate at said first frequency and diffract a first of said beams at a predetermined angle;
   (c) introducing a second signal having a second frequency to said acousto-optic cell, thereby causing said acousto-optic cell to operate at said second frequency and diffract a second of said beams at said same predetermined angle, said second frequency being equal to the product of said first frequency and a ratio of said wavelength for said first beam to said wavelength for said second beam; and
   (d) alternating between introducing said first and second signals to said acousto-optic cell at a rate of at least 50 kHz.

30. The method of claim 29 wherein alternating between introducing said first and second signals to said acousto-optic cell occurs at a rate of at least 75 kHz.

31. A method for diffracting multiple beams, comprising the steps of:
   (a) introducing a plurality of coincident beams into an acousto-optic cell at a common location and angle, each beam having a wavelength, said acousto-optic cell capable of operating at a range of frequencies and diffracting a plurality of beams;
   (b) introducing a first signal having a first frequency to said acousto-optic cell, thereby causing said acousto-optic cell to operate at said first frequency and diffract a first of said beams at a predetermined angle;
   (c) introducing a second signal having a second frequency to said acousto-optic cell, thereby causing said acousto-optic cell to operate at said second frequency and diffract a second of said beams at said same predetermined angle, said second frequency being equal to the product of said first frequency and a ratio of said wavelength for said first beam to said wavelength for said second beam; and
   (d) alternating between introducing said first and second signals to said acousto-optic cell at a rate up to 500 kHz.

* * * * *